United States Patent
Tochikawa et al.

(10) Patent No.: US 7,624,571 B2
(45) Date of Patent: Dec. 1, 2009

(54) EXHAUST GAS PURIFYING APPARATUS FOR INTERNAL COMBUSTION ENGINE AND METHOD FOR ESTIMATING COLLECTED AMOUNT OF EXHAUST PARTICLES

(75) Inventors: Kazuharu Tochikawa, Kariya (JP); Satoru Nosaka, Nagoya (JP); Shigeto Yahata, Obu (JP)

(73) Assignee: Denso Corporation, Kariya (JP)

( * ) Notice: Subject to any disclaimer, the term of this patent is extended or adjusted under 35 U.S.C. 154(b) by 91 days.

(21) Appl. No.: 11/515,791

(22) Filed: Sep. 6, 2006

(65) Prior Publication Data
US 2007/0051099 A1 Mar. 8, 2007

(30) Foreign Application Priority Data
Sep. 6, 2005 (JP) ............................. 2005-257821

(51) Int. Cl.
*F01N 3/00* (2006.01)
(52) U.S. Cl. .............................. 60/297; 60/274; 60/277; 60/295
(58) Field of Classification Search ................... 60/274, 60/276, 277, 286, 295, 297, 311
See application file for complete search history.

(56) References Cited

U.S. PATENT DOCUMENTS

| | | | | |
|---|---|---|---|---|
| 6,722,120 | B2 * | 4/2004 | Plote ........................... | 60/276 |
| 6,947,831 | B2 * | 9/2005 | van Nieuwstadt ........... | 701/114 |
| 6,969,413 | B2 * | 11/2005 | Yahata et al. ............... | 55/282.3 |
| 7,028,467 | B2 | 4/2006 | Kuboshima et al. | |
| 7,104,049 | B2 * | 9/2006 | Hiranuma et al. ............. | 60/295 |
| 7,137,246 | B2 * | 11/2006 | van Nieuwstadt et al. ..... | 60/295 |
| 7,281,369 | B2 * | 10/2007 | Emi et al. ..................... | 60/297 |
| 7,299,626 | B2 * | 11/2007 | Barasa et al. ................. | 60/297 |
| 2005/0217250 | A1 | 10/2005 | Kuboshima et al. | |

* cited by examiner

*Primary Examiner*—Binh Q. Tran
(74) *Attorney, Agent, or Firm*—Nixon & Vanderhye, PC

(57) ABSTRACT

An exhaust gas purifying apparatus for an internal combustion engine includes a collector, which collects exhaust particles in exhaust gas discharged from the internal combustion engine. The exhaust gas purifying apparatus computes an amount of a predetermined gas component in the exhaust gas, which passes through the collector. The exhaust gas purifying apparatus computes a collected amount of the exhaust particles based on a pressure difference across the collector, based on a temperature of the exhaust gas, which passes through the collector, and based on the amount of the predetermined gas component. The exhaust gas purifying apparatus regenerates the collector by burning the exhaust particles collected in the collector when the collected amount reaches a predetermined value.

20 Claims, 2 Drawing Sheets

EXHAUST GAS PURIFYING APPARATUS FOR INTERNAL COMBUSTION ENGINE AND METHOD FOR ESTIMATING COLLECTED AMOUNT OF EXHAUST PARTICLES

CROSS REFERENCE TO RELATED APPLICATION

This application is based on and incorporates herein by reference Japanese Patent Application No. 2005-257821 filed on Sep. 6, 2005.

BACKGROUND OF THE INVENTION

1. Field of the Invention

The present invention relates to an exhaust gas purifying apparatus, which includes a collector that collects particles in exhaust gas (exhaust particles) of an internal combustion engine. Also, the present invention relates to an estimating method for estimating a collected amount of the exhaust particles collected by the collector.

2. Description of Related Art

Recently, in a diesel internal combustion engine mounted on a vehicle, a collector that collects exhaust particles is provided in a middle of an exhaust pipe in order to reduce the exhaust particles in exhaust gas.

The collector is generally a ceramic porous media that includes multiple exhaust gas passages. The collector adsorbs and collects the exhaust particles when the exhaust gas passes through porous partitions that define the exhaust gas passages. When the collected exhaust particles that are collected by the collector remain in the collector, a pressure loss is increased so that an efficiency of the engine will be degraded. Thus, the collector needs to be regenerated by burning (oxidizing) the exhaust particles in the collector when a computed value of a collected amount reaches a predetermined value.

Specifically, the collector carries an oxidation catalytic converter. At a time of the regeneration of the collector, after a main inaction, a post injection is made to supply a hydrocarbon (HC) into the collector such that an interior of the collector is heated due to a catalytic reaction of the HC and the exhaust particles collected in the collector are burned and removed.

An estimation method for estimating the collected amount of the exhaust particles collected in the collector based on a pressure difference across the collector and a flow rate of the exhaust gas is known (see Japanese Unexamined Patent Publication No. 2004-19523, corresponding to U.S. Pat. No. 6,829,889). Also, another method is disclosed to estimate the collected amount based on a temperature of the exhaust gas. This is because physical properties (e.g., viscosity, density) of the exhaust gas changes depending on the temperature of the exhaust gas that passes through the collector.

However, in an apparatus disclosed in Japanese Unexamined Patent Publication No. 2004-19523, a change of physical properties of the exhaust gas, due to a change of exhaust gas components, is not considered. Thus, the may lead to an erroneous estimated value (deviation) of the collected amount.

SUMMARY OF THE INVENTION

The present invention is made in view of the above disadvantages. Thus, it is an objective of the present invention to address at least one of the above disadvantages.

To achieve the objective of the present invention, there is provided an exhaust gas purifying apparatus for an internal combustion engine, the exhaust gas purifying apparatus including a collector, a gas component computing means, and a collected amount computing means. The collector collects exhaust particles in exhaust gas discharged from the internal combustion engine. The gas component computing means computes an amount of a predetermined gas component in the exhaust gas, which passes through the collector. The collected amount computing means computes a collected amount of the exhaust particles based on a pressure difference across the collector, based on a temperature of the exhaust gas, which passes through the collector, and based on the amount of the predetermined gas component computed by the gas component computing means, wherein the exhaust gas purifying apparatus regenerates the collector by burning the exhaust particles collected in the collector when the collected amount computed by the collected amount computing means reaches a predetermined value.

To achieve the objective of the present invention, there is also provided a method for estimating a collected amount of exhaust particles collected in a collector for an internal combustion engine. In this method, an amount of a predetermined gas component in exhaust gas, which is discharged from the internal combustion engine and passes through the collector, is computed. The collected amount of the exhaust particles is computed based on the amount of the predetermined gas component in the exhaust gas.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF PREFERRED EMBODIMENTS

First Embodiment

Figure 1:
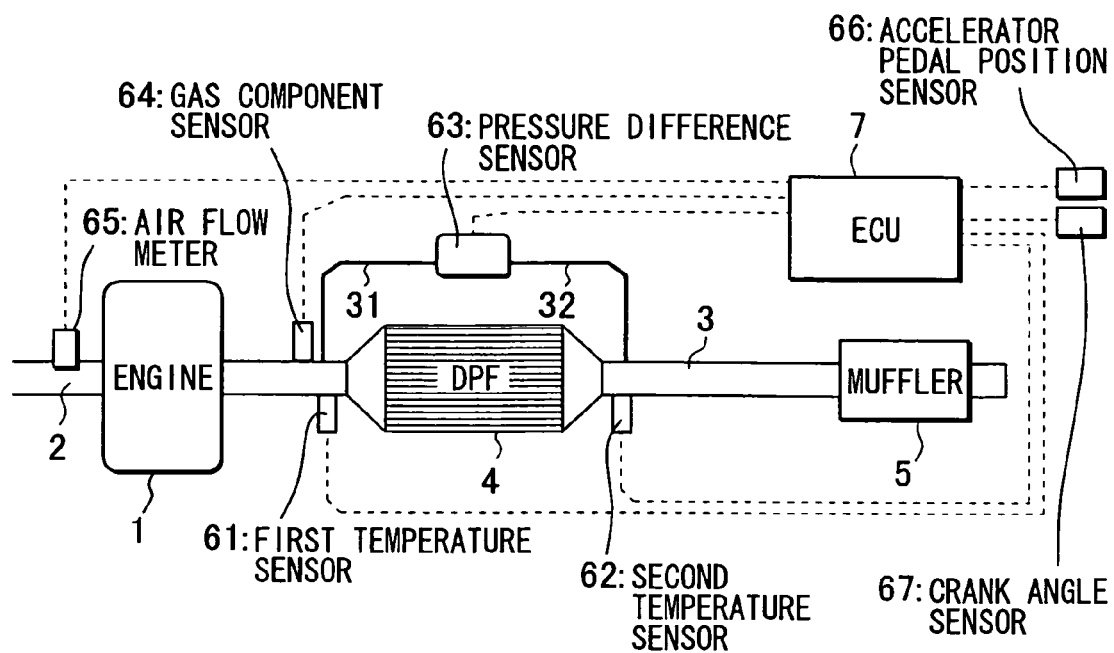
FIG. 1 is a general schematic diagram of an exhaust gas purifying apparatus for an internal combustion engine according to a first embodiment of the present invention.

A first embodiment of the present invention will be described with accompanying drawings. FIG. 1 is a general schematic diagram of an exhaust gas purifying apparatus for an internal combustion engine according to the first embodiment of the present invention.

As shown in FIG. 1, an intake passage 2 and an exhaust passage 3 are connected to a diesel engine (hereinafter referred as the internal combustion engine) 1. The internal combustion engine 1 serves as a power source of a vehicle travel. Intake air passes through the intake passage 2 and exhaust gas discharged from the internal combustion engine 1 passes through the exhaust passage 3. A collector 4 that collects (removes) exhaust particles and an exhaust muffler 5 are provided in a middle of the exhaust passage 3.

The collector 4 includes a filter body, which is formed by sealing passages in a porous ceramic honeycomb body. The porous ceramic honeycomb body is made of a material, such as cordierite, silicon carbide. The exhaust particles in the exhaust gas are collected and deposit on a surface of the filter body. Also, an oxidation catalyst is carried by the surface of the filter body of the collector 4 such that the exhaust particles are oxidized and burned to be removed under a predetermined temperature condition. The oxidation catalyst mainly includes a noble metal, such as platinum, palladium.

A first temperature sensor 61 is provided immediately upstream of the collector 4 in the exhaust passage 3 to sense a temperature (a DPF inlet temperature) of exhaust gas that flows into the collector 4. Also, a second temperature sensor 62 is provided immediately downstream of the collector 4 in the exhaust passage 3 to sense a temperature (a DPF outlet temperature) of the exhaust gas that outflows from the collector 4.

A first branch passage 31 branches off the exhaust passage 3 immediately upstream of the collector 4, and a second branch passage 32 branches off the exhaust passage 3 immediately downstream of the collector 4. A pressure difference sensor 63 is interposed between the first and second branch passages 31, 32 to sense a pressure difference (a cross pressure difference) between an inlet side and outlet side of the collector 4.

A gas component sensor 64 is located immediately upstream of the collector 4 in the exhaust passage 3 to provide an oxygen concentration (an amount of a predetermined gas component) in the exhaust gas that passes through the collector 4. The oxygen concentration greatly influences physical properties (specifically, viscosity) of the exhaust gas.

An air flow meter 65 is provided in the intake passage 2 to sense a mass flow rate of intake air (hereinafter referred as an intake air amount). An accelerator pedal position sensor 66 is provided to an accelerator pedal (not shown) to sense a depressing amount (a pedal position) of the accelerator pedal. The internal combustion engine 1 includes a crank angle sensor 67 for sensing a crank angle position of the internal combustion engine 1.

Outputs from the above various sensors and the air flow meter are inputted to an electronic control unit (ECU) 7. The ECU 7 includes a known microcomputer, which has a CPU, a ROM, and a RAM, and executes various programs stored in the microcomputer in turn. Here, the CPU, the ROM and the RAM are not illustrated. Specifically, the ECU 7 executes a fuel injection control program to control fuel injection quantities into the internal combustion engine 1 based on an operational state of the internal combustion engine 1 (e.g., en engine rotational speed, the depressing amount of the accelerator pedal). Here, the engine rotational speed is computed based on a signal from the crank angle sensor 67, and the depressing amount is sensed by the accelerator pedal position sensor 66. Also, the ECU 7 executes a collector regeneration control program to regenerate the collector 4 at a predetermined timing.

Then, operations of the exhaust gas purifying apparatus according to the present embodiment will be described. The ECU 7 repeatedly executes the collector regeneration program, for example, in a predetermined cycle. Specifically, firstly, the ECU 7 computes a collected amount of the exhaust particles in the collector 4 (a particle deposition amount in the collector 4). When the collected amount reaches a predetermined value, a post injection is made to supply unburned hydrocarbon (HC) into the collector 4. A temperature inside the collector 4 is increased due to a catalytic reaction of the unburned HC such that the exhaust particles in the collector 4 is burned. Thus, the collector 4 is regenerated.

Figure 2:
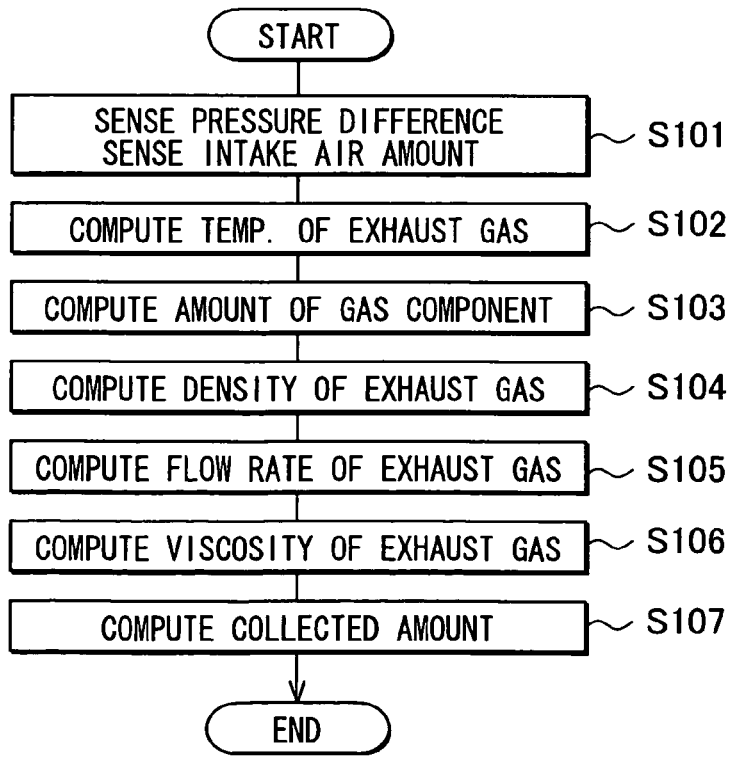
FIG. 2 is a flowchart of a collected amount computing process executed by an electronic control unit (ECU) of FIG. 1.

FIG. 2 is a flowchart of a computing process for computing the collected amount of the exhaust particles in the collector 4 by use of a collector regeneration control program. At step S101, the cross pressure difference ΔP sensed by the pressure difference sensor 63, and the intake air amount sensed by the air flow meter 65 are read.

Then, at step S102, a temperature of the exhaust gas that passes through the collector 4 is computed. The temperature of the exhaust gas is an estimated value (e.g., an average value) based on the DPF inlet and outlet temperatures respectively sensed by the first and second temperature sensors 61, 62.

Then, an amount of the gas component in the exhaust gas that passes through the collector 4 is computed at step S103, which serves as a gas component computing means. The amount of the gas component is an oxygen concentration that is sensed by use of the gas component sensor 64.

Then, at step S104, a density ρ of the exhaust gas that passes through the collector 4 is computed. The density ρ of the exhaust gas is computed based on temperature of the exhaust gas that passes through the collector 4 and an upstream pressure of the collector 4. Here, the upstream pressure may be alternatively replaced by the estimated value based on the cross pressure difference.

Then, at step S105, a flow rate v of the exhaust gas that passes through the collector 4 is computed. The flow rate v of the exhaust gas is computed as follows. Firstly, the mass flow rate indicative of the intake air amount computed at step S101 is converted into a volume flow rate based on the temperature of the exhaust gas and the cross pressure difference ΔP. Then, the above volume flow rate of the exhaust gas is divided by an effective area of a passage of the collector 4 such that the flow rate v of the exhaust gas is attained.

Figure 3:
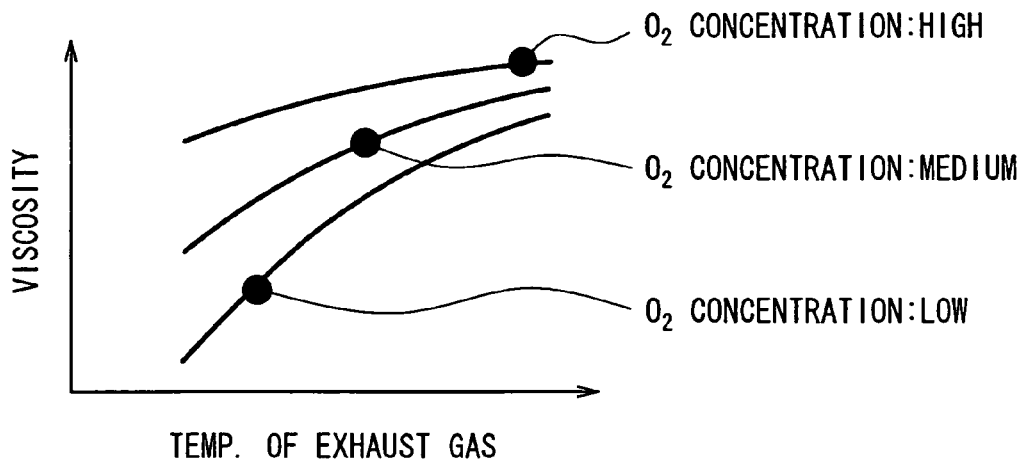
FIG. 3 is diagram showing a viscosity in relation to a temperature and an oxygen concentration of the exhaust gas.

Then, at step S106, a viscosity μ of the exhaust gas that passes through the collector 4 is computed. The viscosity μ is determined based on the temperature of the exhaust gas computed at step S102 and the oxygen concentration computed at step S103. Specifically, the ROM of the ECU 7 stores a map that defines the viscosity μ of the exhaust gas in relation to the temperature and the oxygen concentration of the exhaust gas that passes through the collector 4. The viscosity μ is computed based on the map. FIG. 3 is a diagram showing the above relation, in which the viscosity μ of the exhaust gas is defined in relation to the temperature and the oxygen concentration. When the temperature of the exhaust gas is higher, the viscosity μ of the exhaust gas is set larger. Also, when the oxygen concentration is larger, the viscosity μ of the exhaust gas is set larger.

At step S107 (corresponding to a collected amount computing means), a collected amount ML of the exhaust particles collected (stored) in the collector 4 is computed based on equation (1), which is stored in the ROM of the ECU 7.

$$ML = [\Delta P - (A\mu v + C\rho v^2)]/(B\mu v + D\rho v^2) \qquad \text{equation (1)}$$

In equation (1), ML indicates the collected amount, ΔP indicates the cross pressure difference, μ indicates the viscosity of the exhaust gas that passes through the collector 4, v indicates the flow rate of the exhaust gas that passes through the collector 4, ρ indicates the density of the exhaust gas that passes through the collector 4, and A, B, C and D indicate constants.

As discussed above, the viscosity μ is set higher when the oxygen concentration is higher. As a result, the collected amount ML computed by equation (1) is set smaller when the oxygen concentration is higher.

When the collected amount ML computed based on equation (1) reaches a predetermined value, the collector 4 is regenerated similarly to a conventional technique.

In the present embodiment, because the collected amount is computed in consideration of the oxygen concentration of the exhaust gas that passes through the collector 4, a degree of accuracy in estimating the collected amount can be improved. In other words, the degree of accuracy can be improved because the collected amount is computed in consideration of a change of physical properties of the exhaust gas due to a change of an amount of a gas component of the exhaust gas.

Also, the oxygen concentration, which greatly influences the physical properties of the exhaust gas, is sensed exclusively in all of the gas components in the exhaust gas. Thus, this is easier and less expensive than sensing all the gas components in the exhaust gas.

Second Embodiment

Figure 4:
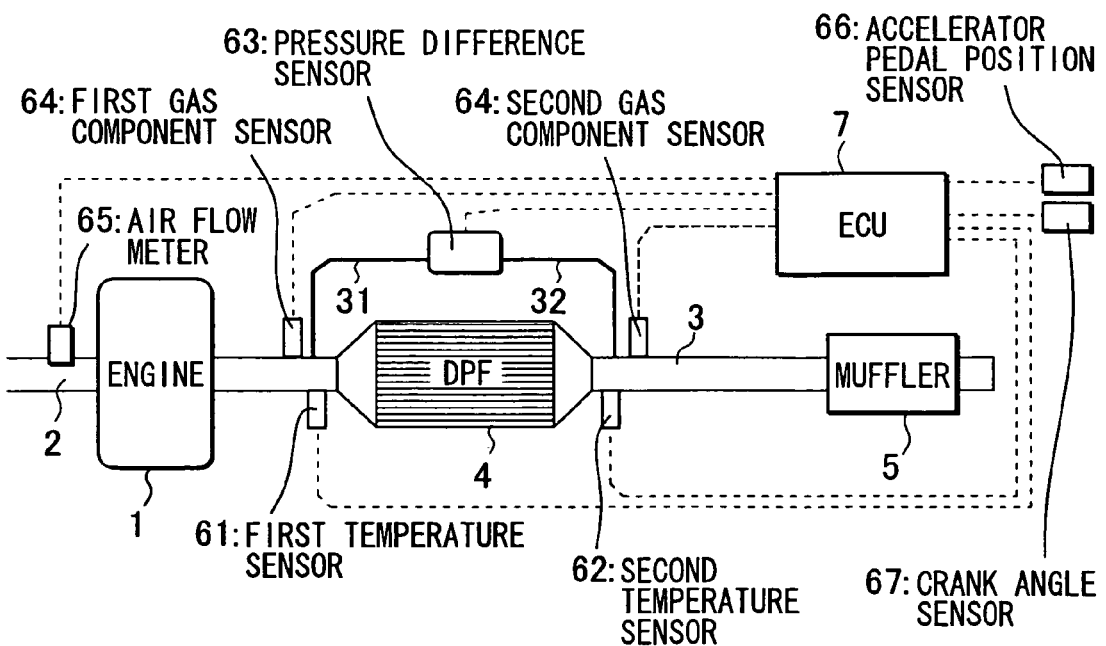
FIG. 4 is a general schematic diagram of an exhaust gas purifying apparatus for the internal combustion engine according to a second embodiment of the present invention.

A second embodiment of the present invention will be described with accompanying drawings. FIG. 4 is a general schematic diagram of an exhaust gas purifying apparatus for the internal combustion engine according to the second embodiment of the present invention. Similar or equal elements of the second embodiment, which are similar or equal to the elements in the first embodiment, will be indicated by the same numerals, and explanation thereof will be omitted.

In the present embodiment, as shown in FIG. 4, gas component sensors (first and second gas component sensors) 64 are provided immediately upstream and immediately downstream of the collector 4 in the exhaust passage 3. Thus, even in a case where the gas components of the exhaust gas are changed in the collector 4, the oxygen concentration in the collector 4 can be highly accurately estimated based on oxygen concentrations upstream of and downstream of the collector 4 in the exhaust gas flow direction. Thus, this leads to a highly accurate estimation of the gas component at the collector 4. Thus, the degree of accuracy in estimating the collected amount can be improved.

Other embodiments will be described. In each of the above embodiments, the collected amount is computed in consideration of the oxygen concentration of the exhaust gas that passes through the collector 4. However, the collected amount may be alternatively computed in consideration of a carbon dioxide ($CO_2$) concentration instead of the oxygen ($O_2$) concentration. In a case where the $CO_2$ concentration is alternatively used, the viscosity $\mu$ of the exhaust gas is set higher when the $CO_2$ concentration is lower. As a result, the collected amount ML computed based on equation (1) is set smaller when the $CO_2$ concentration is lower.

Also, the collected amount may be alternatively computed in consideration of at least two of the $O_2$ concentration, the $CO_2$ concentration, an HC concentration, a carbon monoxide (CO) concentration, and a nitrogen oxides (NOx) concentration.

In each of the above embodiments, at step S103, the $O_2$ concentration is computed based on the output(s) from the gas component sensor(s) 64. However, the $O_2$ concentration may be alternatively computed based on a map that defines a relation between an operational state of the internal combustion engine 1 and the $O_2$ concentration. Here, the operational state of the internal combustion engine includes, for example, a rotational speed of the internal combustion engine 1 and the fuel injection quantity into the internal combustion engine 1. The ROM of the ECU 7 stores the above map. In this case, the gas component sensor(s) 64 is (are) not required.

Also, it is noted that there is a change of physical properties of the exhaust gas due to the reaction of the unburned HC in a case of the regeneration of the collector 4. Thus, there may be prepared two maps for defining the viscosity $\mu$ of the exhaust gas in relation to the temperature and the $O_2$ concentration in the exhaust gas that passes through the collector 4. The two maps include a map used in a case of regeneration of the collector 4 and another map used in a case of non-regeneration of the collector 4. The degree of accuracy in estimating the collected amount during both the regeneration and non-regeneration of the collector 4 by selecting and using a proper map accordingly to the regeneration state (regeneration or non-regeneration) of the collector 4.

Also, alternatively, a temporal collected amount may be computed without consideration of the $O_2$ concentration in the exhaust gas that passes through the collector 4. Then, a final collected amount may be computed by correcting the temporal collected amount based on the $O_2$ concentration.

The gas component sensor 64 may be provided only downstream of the collector 4 in the gas flow direction.

Additional advantages and modifications will readily occur to those skilled in the art. The invention in its broader terms is therefore not limited to the specific details, representative apparatus, and illustrative examples shown and described.

What is claimed is:

1. An exhaust gas purifying apparatus for an internal combustion engine, said apparatus comprising:
    a collector that collects exhaust particles in exhaust gas discharged from the internal combustion engine, said exhaust gas containing plural constituent components;
    a gas component computing means for computing an amount of a predetermined subset of at least one of said gas components in the exhaust gas, which passes through the collector; and
    a collected amount computing means for computing a collected amount of the exhaust particles prior to regeneration based on (a) a pressure difference across the collector, (b) a temperature of the exhaust gas, which passes through the collector, and (c) the amount of the predetermined gas component computed by the gas component computing means,
    wherein the exhaust gas purifying apparatus initiates regeneration of the collector by burning the exhaust particles collected in the collector when the collected amount computed by the collected amount computing means reaches a predetermined value as determined based on (a) pressure difference across the collector, (b) a temperature of the exhaust gas, which passes through the collector, and (c) the amount of the predetermined gas component computed by the gas component computing means.

2. The exhaust gas purifying apparatus according to claim 1, wherein:
    the gas component computing means computes an oxygen concentration as the amount of the predetermined gas component in the exhaust gas; and
    the collected amount computing means computes the collected amount such that the collected amount is smaller when the oxygen concentration is larger.

3. The exhaust gas purifying apparatus according to claim 2, wherein the gas component computing means computes the oxygen concentration based on an operational state of the internal combustion engine.

4. The exhaust gas purifying apparatus according to claim 2, wherein:
    the component computing means includes at least one gas component sensor that senses oxygen; and the component computing means computes the oxygen concentration based on an output of the at least one gas component sensor.

5. The exhaust gas purifying apparatus according to claim 4, wherein the at least one gas component sensor is only disposed upstream of the collector in a flow direction of the exhaust gas.

6. The exhaust gas purifying apparatus according to claim 4, wherein the at least one gas component sensor is only disposed downstream of the collector in a flow direction of the exhaust gas.

7. The exhaust gas purifying apparatus according to claim 4, wherein:
the at least one gas component sensor includes a first gas component sensor and a second gas component sensor;
the first gas component sensor is disposed upstream of the collector in a flow direction of the exhaust gas; and
the second gas component sensor is disposed downstream of the collector in the flow direction of the exhaust gas.

8. The exhaust gas purifying apparatus according to claim 1, wherein:
the collected amount computing means computes the collected amount in a first method while the collector is regenerated; and
the collected amount computing means computes the collected amount in a second method, which is different from the first method, while the collector is not regenerated.

9. The exhaust gas purifying apparatus according to claim 1, wherein:
the predetermined gas component is one of a plurality of predetermined gas components;
the gas component computing means computes at least two of the group consisting of: (a) an oxygen concentration, (b) a carbon dioxide concentration, (c) a hydrocarbon concentration, (d) a carbon monoxide concentration and (e) a nitrogen oxides concentration; and
each of the at least two serves as an amount of a corresponding one of the plurality of predetermined gas components in the exhaust gas.

10. A method for estimating a collected amount of exhaust particles collected in a collector for an internal combustion engine, said method comprising:
sensing a pressure difference across the collector;
sensing a temperature of the exhaust gas which passes through the collector;
computing an amount of a predetermined gas component in exhaust gas, which is discharged from the internal combustion engine and passes through the collector;
computing an estimated amount of collected exhaust particles prior to regeneration based on the pressure difference, the temperature of the exhaust gas and the computed amount of the predetermined gas component in the exhaust; and
initiating regeneration of the collector by burning the exhaust particles collected in the collector when the computed estimated amount reaches a predetermined value as determined based on the pressure difference, the temperature of the exhaust gas and the computed amount of the predetermined gas component in the exhaust gas.

11. The method according to claim 10, wherein:
computing of the amount of the predetermined gas component includes computing an oxygen concentration; and
computing of the collected amount includes computing the collected amount such that the collected amount is smaller when the oxygen concentration is larger.

12. The method according to claim 11, wherein computing of the amount of the predetermined gas component includes computing the oxygen concentration based on an operational state of the internal combustion engine.

13. The method according to claim 10, further comprising:
computing a flow rate of the exhaust gas which passes through the collector, and
wherein computing of the collected amount of the exhaust particles includes computing the collected amount based on the pressure difference, the temperature of the exhaust gas, the flow rate of the exhaust gas, and the amount of the predetermined gas component.

14. The method according to claim 11, wherein computing of the amount of the predetermined gas component includes sensing oxygen in the exhaust gas at a position upstream of the collector in a flow direction of the exhaust gas.

15. The method according to claim 11, wherein computing of the amount of the predetermined gas component includes sensing oxygen in the exhaust gas at a position downstream of the collector in a flow direction of the exhaust gas.

16. The method according to claim 11, wherein computing of the amount of the predetermined gas component includes sensing oxygen in the exhaust gas at a first position upstream of the collector and at a second position downstream of the collector in a flow direction of the exhaust gas.

17. The method according to claim 10, wherein:
computing of the collected amount includes computing the collected amount based on a first map while the collector is regenerated; and
computing of the collected amount includes computing the collected amount based on a second map, which is different from the first map, while the collector is not regenerated.

18. The exhaust gas purifying apparatus according to claim 10, wherein:
the predetermined gas component is one of a plurality of predetermined gas components;
computing of the predetermined gas component amount includes computing at least two of a group consisting of: (a) an oxygen concentration, (b) a carbon dioxide concentration, (c) a hydrocarbon concentration, (d) a carbon monoxide concentration and (e) a nitrogen oxides concentration; and
each of the at least two serves as an amount of a corresponding one of the plurality of predetermined gas components in the exhaust gas.

19. The exhaust gas purifying apparatus according to claim 1, wherein:
the collected amount computing means computes a viscosity of the exhaust gas based on the temperature of the exhaust gas and the amount of the predetermined gas component; and
the collected amount computing means computes the collected amount of the exhaust particles based on the viscosity.

20. The method according to claim 10, wherein:
the computing of the collected amount of the exhaust particles includes:
computing a viscosity of the exhaust gas based on the temperature of the exhaust gas and the amount of the predetermined gas component; and
computing the collected amount of the exhaust particles based on the viscosity.

* * * * *